United States Patent [19]

Klotzbach

[11] 3,815,433
[45] June 11, 1974

[54] DRIVE MECHANISM FOR A CONVEYOR DEVICE FOR PRODUCING AN INTERMITTENT CONVEYING MOVEMENT IN ACCORDANCE WITH A DESIRED PATTERN OF MOVEMENT

[76] Inventor: Kurt Klotzbach, Wittener Strasse 3, 4 Dusseldorf-Rath, Germany

[22] Filed: Sept. 7, 1972

[21] Appl. No.: 285,098

[30] Foreign Application Priority Data
Sept. 17, 1971 Germany............................ 2146518

[52] U.S. Cl..................................... 74/393, 74/844
[51] Int. Cl............................................. F16h 19/06
[58] Field of Search ............. 74/393, 394, 844, 846

[56] References Cited
UNITED STATES PATENTS

| | | | |
|---|---|---|---|
| 2,535,774 | 12/1950 | Armelin | 74/394 |
| 2,552,246 | 5/1951 | Wilchens | 74/393 |
| 2,962,905 | 12/1960 | Wildhaber | 74/393 |
| 3,076,351 | 2/1963 | Moss | 74/394 |
| 3,699,818 | 10/1972 | Klotzbach | 74/393 |

FOREIGN PATENTS OR APPLICATIONS

| | | | |
|---|---|---|---|
| 951,806 | 0/1947 | France | 74/393 |
| 659,415 | 0/1951 | Great Britain | 74/394 |

Primary Examiner—Charles J. Myhre
Assistant Examiner—R. H. Lazarus
Attorney, Agent, or Firm—Hill, Gross, Simpson, Van Santen, Steadman, Chiara & Simpson

[57] ABSTRACT

A drive mechanism for a conveyor device for producing an intermittent conveying movement in accordance with a desired pattern of movement comprises a motor driving an output shaft via an infinitely variable transmission the transmission ratio of which is variable in accordance with the position of a cam follower on a cam disc which is rotated by a further transmission driven by the output shaft.

3 Claims, 3 Drawing Figures

DRIVE MECHANISM FOR A CONVEYOR DEVICE FOR PRODUCING AN INTERMITTENT CONVEYING MOVEMENT IN ACCORDANCE WITH A DESIRED PATTERN OF MOVEMENT

This invention relates to a drive mechanism for producing an intermittent conveying movement in accordance with a desired pattern of motion, for conveyor devices by means of which suspended panes of glass are taken through an annealing furnace or are introduced into and removed from said furnace.

Drive mechanisms of this kind are used to move the conveyor device in such a manner that the panes of glass suspended therefrom do not start to swing or rock, since if they did they would become released from the retaining tongs holding them and might break. It is also difficult to align a rocking pane with the bending tools of a bending station following the annealing furnace.

An attempt has already been made to prevent panes of glass from rocking by using a conveyor which takes the panes through the annealing furnace with a speed varying with time in accordance with a sine law (German Pat. No. 1,061,487). In this known arrangement a mechanical device is used to produce the sine movement, and utilises the movement of Cardan joints. However, it has been found that even this drive mechanism cannot adequately prevent the panes of glass from rocking.

The panes of glass are also particularly at risk when lowered vertically into the hardening furnace, since the tips of the retaining tongs have not yet pressed into the cold panes of glass.

Equally unfavourable is an uneven acceleration pattern when the heat-treated panes are lifted out of the furnace and conveyed to a bending or quenching station disposed above or in line with the furnace, since in these conditions the clamping force of the tongs increases and the tips of the tongs are pressed more deeply into the still soft glass. The imprints of the tongs may then be starting points for breakage of the glass during the subsequent hardening or subsequent stresses.

An object of the invention is to provide a drive mechanism, for producing an intermittent conveying movement in accordance with a desired pattern of motion which is more compact than previous such mechanisms.

Another object of the invention is to produce a drive mechanism which can be used even in connection with furnaces in which the panes of glass are moved by an intermittently moving conveyor device, for example a roller table or a chain, extending over the entire length of the furnace.

To this end, according to the invention, there is provided a drive mechanism for a conveyor device, for producing an intermittent conveying movement in accordance with a desired pattern of movement, the drive mechanism comprising motor means, first, infinitely variable, transmission means driven by said motor means and output means driven by said variable transmission means, control means for said first infinitely variable, transmission means including a rotatable cam disc and cam follower means co-operating with the disc, means connecting said cam follower means with said first infinitely variable, transmission means whereby movement of said cam follower means varies the transmission ratio of said first transmission means, drive means for said cam disc including second transmission means drivingly connecting said disc with said output means to be driven thereby.

The contour of the cam disc may have one or more elevated portions and one or more depressions, said control means being such that the rate of movement of said output means is at a minimum when said cam follower means is in engagement with the lowest point of a said depression, the mechanism including limit switch means operable by said cam disc when said cam follower means is in engagement with the lowest point of a said depression.

Preferably, the cam disc is heart-shaped and performs one revolution during an intermittent feed movement.

If it is desired to vary the intermittent feed travel of a device driven by the mechanism within given limits, said second transmission means by be variable by means of a manually operable adjusting member.

Although the pattern of the intermittent movement as determined by the cam disc generally proceeds within a given time, it may occasionally be desirable to vary this time. In such cases, the fixed-speed squirrel-cage motor preferably used as drive motor means may be replaced by a variable motor, for example, a d.c. motor or a frequency controlled polyphase motor, or possibly a remotely controllable transmission having a variable step-up ratio may be provided between the squirrel-cage motor and the first infinitely variable transmission means.

One embodiment of the invention is described below with reference to the drawings wherein.

Figure 1:
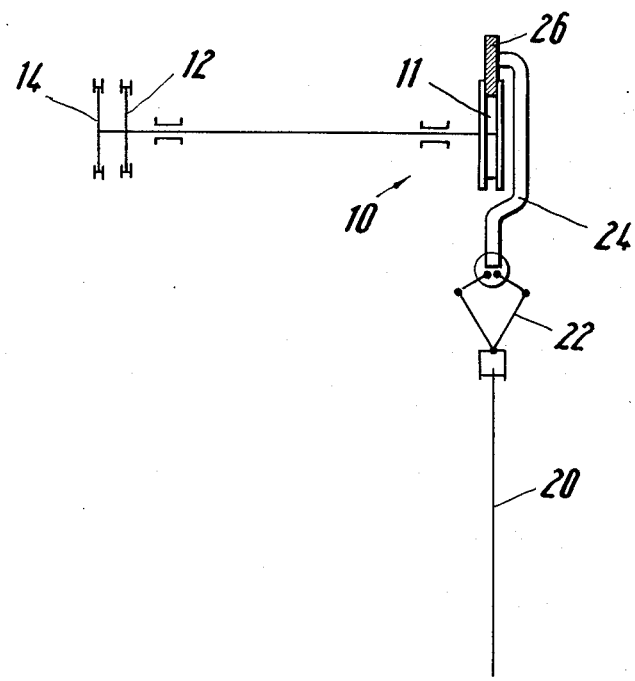
FIG. 1 is a diagrammatic elevation of a roller of a roller table on which a moving rail from which the pane of glass is suspended, is moved.
Figure 2:
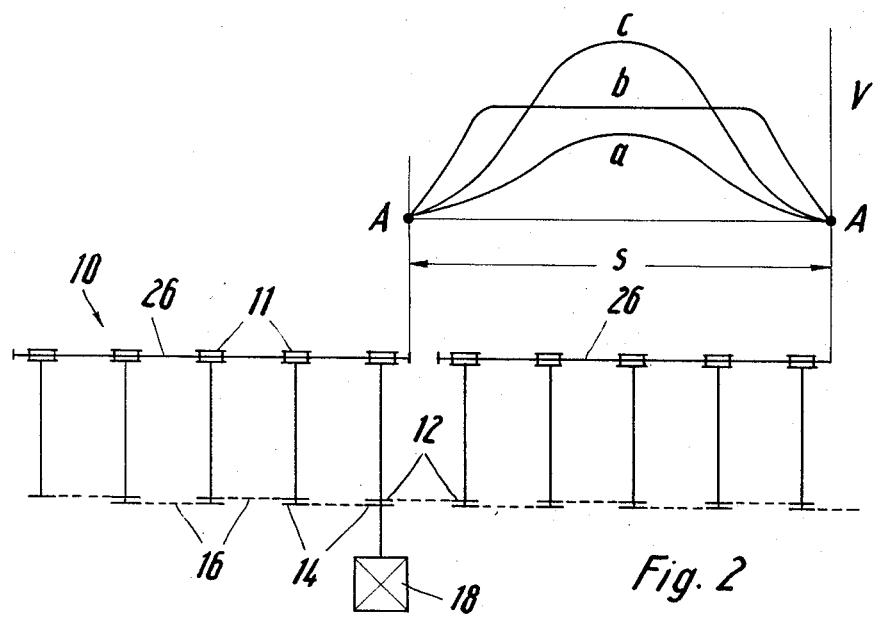
FIG. 2 is a diagrammatic plan view of the roller table together with a diagram showing the pattern of the movement of the feed or advance motion.

FIGS. 1 and 2 diagrammatically illustrate the construction of a conventional roller table comprising a number of conveyor rollers 11, on the drive shafts of which are mounted sprockets wheels 12, 14 which are interconnected by chains 16, one of the shafts being driven by the novel drive mechanism which has been given the general reference 18.

The pane of glass 20 to be hardened is suspended by tongs 22 from suspension members 24 (only one suspension member is shown in FIG. 1), which form part of a moving rail 26 extending over a plurality of conveyor rollers 11 of the roller table.

The rails 26 together with the panes of glass suspended therefrom are moved to the left in FIG. 2. intermittently through the furnace (not shown), and after each advance operation a rail 26 provided with a pane of glass requiring to be annealed is placed upon the part of the roller table which has then become free (the right-hand part in FIG. 2), and this part may be situated outside the furnace. At the same time, a rail emerging from the other end of the furnace and containing a pane of glass which has been annealed is fed on to a station for further treatment.

Figure 3:
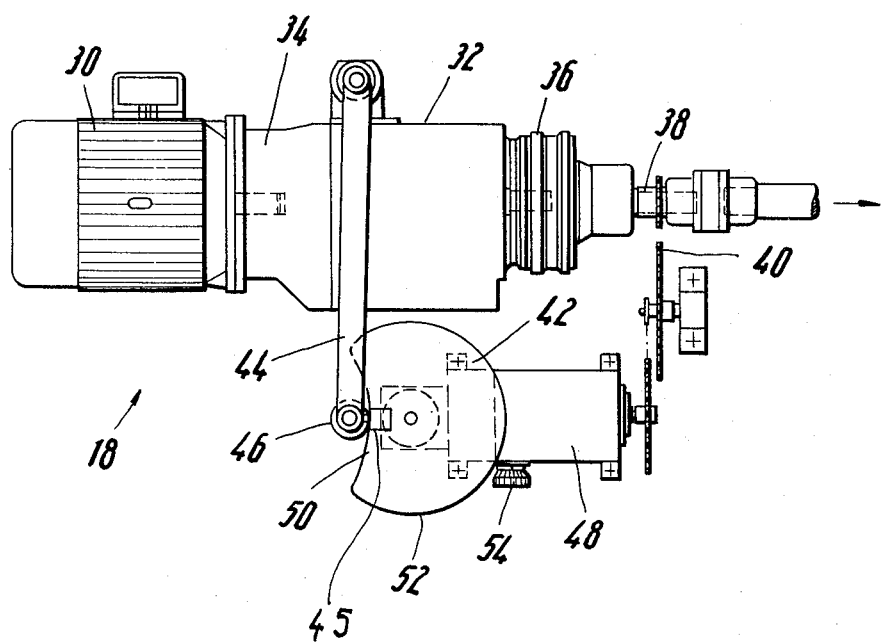
FIG. 3 is a plan view of the drive mechanism.

The drive mechanism 18 shown in detail in FIG. 3 for the roller table comprises an infinitely variable transmission 32 which is driven by a drive motor 30. The transmission 32 may, for example, consist of an infinitely variable oil transmission 34 and a constant reduction-ratio output section 36. An output shaft 38 of the transmission 32 drives the rollers 11 of the roller table 10 via the sprocket wheels 12 and 14.

A heart-shaped cam disc 42 is driven via a reduction gear 40 which is driven from the output end of the transmission 32, and controls the infinitely variable transmission 34 via a cam-follower lever 44. The lever 44, which in the example illustrated is articulated on the transmission 34, has at its free end a cam-follower roller 46. The lever and the roller are pressed against the disc 42 by a spring (not shown).

In the embodiment illustrated, a variable transmission 48 is provided between the cam disc 42 and the reduction gear 40, and its purpose will be explained hereinafter.

The drive mechanism 18 operates as follows: At the start of each intermittent advance movement of the roller table resulting from the motor 30 being put into operation, the roller 46 is situated at the lowest point of the depression 50 of the cam disc contour.

This position of the lever or roller corresponds to a very low speed of the conveyor rollers (about 3.5 r.p.m.). As the cam disc 42 moves on, the lever 44 gradually pivots to the left (FIG. 3), until it bears against the "elevated" portion 52 of the cam disc, which is circular in FIG. 3. This position of the lever corresponds to maximum speed of the conveyor rollers 11, which may, for example, be 86 r.p.m. This speed is maintained on further rotation of the disc 42 until, at the end of the elevated circular portion, the lever 44 pivots back to the right and the speed gradually drops. When the roller 46 bears against the lowest point of the depression 50 again, the motor 30 is stopped by a limit switch (45) which may be secured to the disc 42.

In the graph in FIG. 2 displacement of a suspension member along the conveyor rollers is plotted horizontally while its correspondings velocity is plotted vertically. The graph shows the velocity during displacement from a first point A at which the suspension member is at rest to the next point A at which it is again at rest, the distance between the two points A being indicated by S. It will be appreciated that the points A therefore correspond to positions of the suspension member at which the roller 46 is situated at the lowest point of the depression 50. The feed travel S thus corresponds in the embodiment described abovt to a complete revolution of the disc 42. The limit switch 45 may be closed by the arm 44 when the roller 46 is at the low point of the cam disc. Said limit switch serves to deenergize the motor 30 upon the termination of feed travel as the sheets have been transported from point A to point A, as diagrammatically shown in FIG. 2. Of course cam discs having a number of elevations and depressions may be used, so that the feed travel S would then correspond only to a corresponding partial rotation of the disc.

It will be apparent that the contour illustrated for the disc 42, the speed along the distance S varies substantially as shown by the curve $b$ in the graph in FIG. 2. If the disc has a different contour the speed would vary in a different manner, for example as shown by curve $a$ or curve $b$.

As already stated hereinbefore, in some cases it may be desirable to increase or reduce the feed travel S, for example by 6 percent. This is achieved by adjusting the variable transmission 48, which has a corresponding range of adjustment and degree of uniformity. The control knob for this transmission has the reference 54, and the form of the movement or speed curve of FIG. 2 is not influenced by this adjustment, but only the scale along the distance axis.

If the time required for a feed movement is to be variable, this can be achieved, as already stated, by using a variable drive motor or, if the motor used has a substantially constant speed, by means of a variable transmission provided between this motor and the transmission system, without the form of the graph being influenced, the scale along the velocity axis only being changed.

I claim:
1. An intermittent uniformly variable transmission particularly adapted to provide an intermittent uniformly variable conveying motion for conveying sheets of glass and the like during a treating process thereof comprising
   a motor,
   a first infinitely variable transmission means driven by said motor,
   a conveyor drive shaft driven by said first infinitely variable transmission means and adapted to provide a conveyor drive means,
   a second variable transmission means spaced to one side of said infinitely variable transmission means,
   a drive from said drive shaft to said second variable transmission means,
   manually operable means for adjusting said second variable transmission means, and
   means driven by said second variable transmission means for varying said first infinitely variable transmission means comprising cam means driven from said second variable transmission means, a lever pivoted to said first infinitely variable transmission means, a follower on said lever engaging said cam means and a limit switch operated by said cam means and lever for terminating the drive to said drive shaft upon a complete cycle of movement of the conveyor drive means.
2. The intermittent uniformly variable transmission of claim 1,
   wherein the cam means has a uniformly contoured high portion and at least one low portion in communication with said high portion.
3. The intermittent uniformly variable transmission of claim 3,
   wherein the limit switch on said cam means is carried by said cam means at the low portion thereof.

* * * * *